Patented May 15, 1951

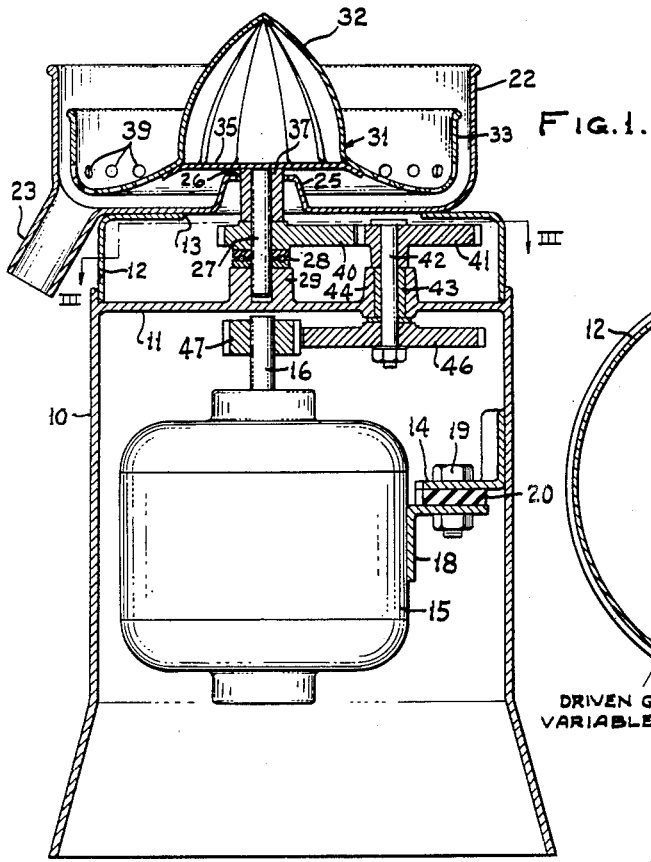

2,552,572

UNITED STATES PATENT OFFICE 2,552,572

FRUIT JUICE EXTRACTOR HAVING CYCLICALLY VARYING VELOCITY

Stanley J. Mikina, Wilkinsburg, Pa., assignor to Westinghouse Electric Corporation, East Pittsburgh, Pa., a corporation of Pennsylvania Application May 17, 1946, Serial No. 670,625

5 Claims. (Cl. 146—3)

1

This invention relates to appliances for extracting fruit juices, and more particularly to a juice extractor having a rotary reamer and strainer adapted to be operated by an electric motor for extracting juice from citrus fruit.

Motor-driven fruit juice extractors heretofore designed have included a rotary shaft adapted to be driven at a relatively constant high speed, a reamer mounted on the shaft within a bowl or receptacle for receiving the juice, and a strainer operatively mounted on a rotary sleeve, which is arranged to be independently oscillated during rapid unidirectional rotation of the reamer. According to the intended operation of the juice extractor having this construction, fruit pulp and juice reamed out by the reamer drop on the strainer, which, due to its rapid oscillation, then effects further shredding of the pulp and allows the smaller particles to flow with the juice to the receiving bowl.

A principal object of my invention is to provide an improved juice-extracting appliance, having a rugged but economically constructed means for extracting fruit juice and for making potable and mixing with the juice the fruit pulp removed from the fruit.

In accordance with my invention, I provide means for effecting this improved result comprising a casing supporting a receiving bowl, a reamer, a driving motor, and a strainer adapted to be rotated coaxially with the reamer at a cyclically-varying angular velocity, so that the strainer will be subjected to a relative reciprocation superposed upon its steady average rotation. The strainer may advantageously be integral with the reamer, or otherwise rotate as a unit therewith.

A further feature of the invention is the provision of a fruit juice extractor having a rotary strainer a motor and transmission means for driving the strainer from the motor, including a pair of elliptical gears.

Another feature is the provision of a fruit juice appliance of the above type having an integral reamer and strainer element, and operating means for rotating the element at a cyclically-varying speed, thereby facilitating the extraction of juice and shredding of the desirable parts of pulp from fruit manually applied to the reamer.

Other objects and advantages of the invention will appear in the following more detailed description thereof, taken in connection with the accompanying drawing, in which:

Fig. 1 is a side elevational view, mainly in section, of a juice extracting and straining appliance, embodying features of the invention in a preferred form;

Fig. 2 is a plan view of the reamer and strainer of the appliance shown in Fig. 1;

Fig. 3 is a sectional view taken substantially along the line III—III of Fig. 1;

Fig. 4 is a fragmentary sectional view of the elliptical gears shown in Fig. 1 and illustrating a different position thereof; and Fig. 5 is an enlarged detail sectional view of a portion of the strainer shown in Fig. 1.

Although it will be understood that a fruit juice extracting and straining device constructed in accordance with my invention may be embodied in other forms, such as in combination with a food mixer or the like, I have illustrated the invention in Fig. 1 in the form of a unit designed for use solely as a fruit juice extractor. In the form of the invention shown in Fig. 1, there is provided a substantially cylindrical supporting casing 10, closed at its upper end by a wall 11, on the upper side of which is mounted an annular flange member 12, having a central opening 13. One or more brackets 14 are welded or otherwise secured to an inner wall of the casing 10 and serve as a support for a motor 15, having a shaft 16. The housing of the motor 15 is provided with a projecting bracket or brackets 18 adapted to be secured to the brackets 14 by means of bolts 19. Resilient means, such as a block 20 of rubber or other plastic composition material, may be interposed between the brackets 14 and 18 for absorbing vibration produced by operation of the motor 15.

Mounted on top of the annular flange member 12 is a juice receptacle or bowl 22, having a discharge spout 23 projecting downwardly and outwardly of the casing 10. The bowl 22 may be formed of any suitable material, such as porcelain or stainless metal, and has a centrally-disposed sleeve portion 25, which extends upwardly from the bottom of the bowl and has a central aperture 26. Extending upwardly through the opening 13 in the flange 12 and the aperture 26 of the bowl 22 is a rotary spindle 27, the lower end of which is journaled in a boss 29 on the horizontal wall 11 and supported on an antifriction bearing assembly 28 disposed on the boss 29. It will be apparent that, so far as the present invention is concerned, any suitable bearings for the various shafts may be provided.

The upper end of the spindle 27 is adapted to support a juice extracting and straining element, indicated generally by the reference character 31, which comprises an integral reamer portion 32 and cup-shaped strainer portion 33 extending from the base of the reamer portion. The juice extracting and straining element 31 may be stamped or otherwise formed from a single sheet of suitable material, such as stainless steel, and is provided with a reinforcing disc element 35, the annular margin of which is brazed to the strainer portion 33 beneath the centrally-disposed reamer portion 32. For securing the element 31 to the shaft 27, the disc 35 has secured thereto a suitable collar 37, which is preferably provided with a polygonal opening for receiving a similarly-formed upper end of the spindle 27, in order to prevent relative rotation between the element 31 and the spindle. By making the reamer and strainer unit or element 31 of comparatively thin gauge material in the form of a one-piece stamping, the inertia torque on the associated driving mechanism is minimized.

A plurality of apertures 39 are formed in the lower surface of the strainer portion 33, and as is best shown in Fig. 5 of the drawing, the material at the margin of each aperture 39 may be deformed upwardly and suitably ground to provide sharp edges projecting from the bottom of the strainer portion.

According to my invention, the juice extracting and straining element 31 is adapted to be driven continuously in one direction, but at a periodically-varying angular velocity, through the medium of a transmission assembly which includes a variable speed driven gear 40 of elliptical form, which is keyed or otherwise secured to the spindle 27, and a constant speed driving gear 41, which matches the driven gear 40 in elliptical form and is suitably keyed to a vertically-disposed shaft 42. The shaft 42 is journaled in a bearing 43, which is mounted in a bearing portion 44 formed on the wall 11 of the casing structure. The lower end of the shaft 42 extends below the wall 11 and has suitably keyed thereto a reducing gear 46, which operatively engages a relatively small pinion 47 secured to the upper end of the motor shaft 16. It will be understood that the shaft 42 is so located with respect to the spindle 27 as to permit disposition of the elliptical gears 40 and 41 as shown in Fig. 3, so that the horizontal axes of the gears will be aligned twice during each revolution. Through the medium of the pinion 47 and reducing gear 46, the shaft 42 and the elliptical gear 41 attached thereto are driven at a relatively constant speed corresponding with the higher speed of the motor shaft 16. It will be apparent, however, that by reason of the elliptical form of the cooperating gears 40 and 41, the latter, together with the spindle 27, will be rotated at a cyclically-varying angular speed.

It will now be seen that when the appliance shown in Fig. 1 is rendered operative to ream juice and pulp from fruit applied to the reamer 32, the pulp deposited on the strainer portion 33 will resist the harmonically-varying acceleration of the reamer and strainer unit with inertia forces that will press the pulp mass against the cutting edges adjacent the apertures 39. This action will result in the desired cutting and detrition of the fruit pulp. At the same time, the rapid changes in velocity of the element 31 will promote a steady flow of juice and the desirable particles of pulp mixed therewith through the apertures 39.

The frequency of cycles of variation in speed at which the reaming and straining element 31 should be driven, in order to promote maximum pulp shredding efficiency, can readily be calculated for any given size of appliance. A frequency of 10 cycles per second, for example, may be found suitable. In designing a machine embodying features of my invention, it should be borne in mind that in the case of the elliptical gear driven strainer, the fruit pulp is thrown to the outer portion of the strainer by an appreciable centrifugal force. Hence, in order to insure that relative motion will occur between the pulp and the cutting edges carried by the strainer, the tangential acceleration force on the pulp mass should be great enough to overcome the friction caused by the centrifugal force acting on the mass. I have found, however, that matched elliptical gears of relatively small proportions can be successfully utilized to drive the fruit juice extracting and straining element at a speed rapidly alternating between predetermined maximum and minimum rates to effect efficient shredding of the fruit pulp, so that sufficient pulp will be mixed with the juice to insure good flavor and maximum vitamin content of the drink.

From the foregoing it will be apparent that I have provided an improved fruit juice extracting and straining appliance, the operating elements of which are constructed and arranged to be driven at a cyclically-varying angular velocity from a shaft that is rotated at a relatively constant angular velocity. Although I have described a preferred means for imparting the desired varying angular speed to the fruit juice extracting and straining elements, comprising the elliptical gears disclosed in the drawing, it will be apparent that other driving means may be substituted for the elliptical gears, such as one or more universal joints having independently-mounted shafts, one of which is disposed at an angle with respect to the other.

While I have shown my invention in but one form, it will be obvious to those skilled in the art that it is not so limited but is susceptible of various changes and modifications without departing from the spirit thereof.

What I claim is:

1. In a fruit juice extracting and straining appliance, in combination, a driving element operative at a relatively constant speed, a driven element, juice extracting and straining means mounted on said driven element, and comprising a rotary reamer and a strainer fixed thereto for receiving juice and pulp extracted by said reamer, said strainer having cutting edges for shredding pulp upon relative rotary movement of the pulp and the strainer, and transmission means interposed between said driving and driven elements, including a pair of elliptical gears operative to effect unidirectional rotation of said driven element at cyclically accelerating and decelerating velocity for effecting relative movement between said extracting and straining means and the juice contained therein.

2. An appliance for extracting juice from fruit comprising a housing supporting an open receiving bowl, a motor having a driving shaft mounted in said housing, a driven element journaled in said housing, a reaming and straining element mounted on said driven element within said bowl, said reaming and straining element comprising a rotary reamer and an integral apertured strainer portion encompassing said reamer and having a plurality of pulp cutting edges formed on an inner surface thereof, and transmission means having a cyclically varying speed ratio, said transmission means operatively connecting said motor shaft and said driven element for effecting continuous rotation of said reaming and straining element at a cyclically varying angular velocity, facilitating rapid shredding of extracted pulp and flow of strained juice to said bowl.

3. In a fruit juice extracting appliance, in combination, an extracting device comprising an integral reamer and strainer for receiving juice and pulp extracted by the reamer, said strainer being formed with cutting edges, a driven element journaled in said appliance for supporting said extracting device, a motor having a driving shaft mounted within said appliance, an elliptical gear operated by said driving shaft at a relatively constant speed, and a matched elliptical gear cooperative with said first elliptical gear for unidirectionally rotating said driven element at a cyclically varying rate effecting motion of said strainer relative to juice contained therein.

4. In a fruit juice extracting appliance, in combination, an integral rotary juice extracting device having a reamer portion and a strainer portion for receiving juice and pulp extracted by said reamer, said strainer portion having a plurality of apertures and cutting edges formed thereon, means for receiving juice and pulp discharged from said strainer, and mechanism constructed and arranged to effect unidirectional rotation of said extracting device at a cyclically varying velocity, comprising an elliptical driving gear rotatable at a relatively constant speed, an ellipical driven gear operative by said driving gear and means operatively connecting said driven gear to said juice extracting device, said elliptical gears being so proportioned as to effect rotation of said juice extracting device at rates of acceleration and deceleration promoting relative movement and efficient shredding of pulp and mixture thereof with juice passing through said strainer.

5. In a fruit juice extracting appliance, in combination, a casing supporting a receiving bowl having a central opening, a motor mounted in said casing, a first shaft rotatably mounted in said casing and operative at constant speed by said motor, a second shaft rotatably mounted in said casing in alignment with said opening in the receiving bowl, transmission means having a cyclically varying speed ratio for operatively connecting said shafts, said means being operative by said first shaft to effect alternating unidirectional acceleration and deceleration of said second shaft, and a fruit reamer member secured to said second shaft and comprising a central reamer portion and an annular apertured strainer portion encompassing the reamer portion for receiving juice and pulp therefrom, said strainer portion having cutting edges for shredding fruit pulp, said reamer member being rotatable at speeds rapidly and harmonically varying between predetermined maximum and minimum rates for agitating juice and pulp deposited in said strainer portion, said reamer member being pulsated and said pulp being subjected to inertia forces resisting the variations in speed of the reamer to promote relative movement and detrition of the pulp during engagement with said strainer portion.

STANLEY J. MIKINA.

REFERENCES CITED

The following references are of record in the file of this patent:

UNITED STATES PATENTS

| Number | Name | Date |
| --- | --- | --- |
| 184,419 | Ohl | Nov. 14, 1876 |
| 504,645 | Zimmermann | Sept. 5, 1893 |
| 653,058 | Beggs | July 3, 1900 |
| 1,449,845 | Taylor | Mar. 27, 1923 |
| 1,962,856 | Benson | June 12, 1934 |
| 2,144,390 | Rupert et al. | Jan. 17, 1939 |
| 2,186,672 | Fromm | Jan. 9, 1940 |
| 2,249,817 | Fromm | July 22, 1941 |